No. 12,665. REISSUED JUNE 25, 1907.
H. J. PERKINS.
PROPELLER WHEEL.
APPLICATION FILED APR. 25, 1907.
3 SHEETS—SHEET 1.
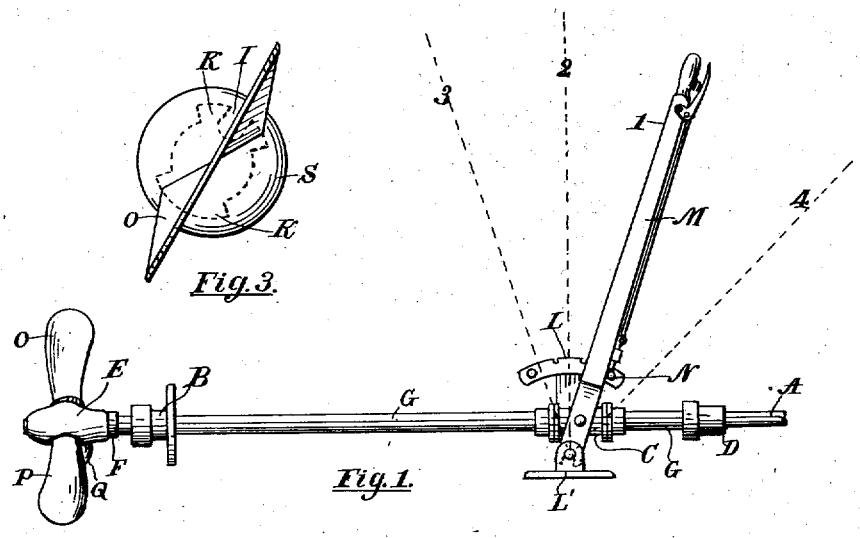
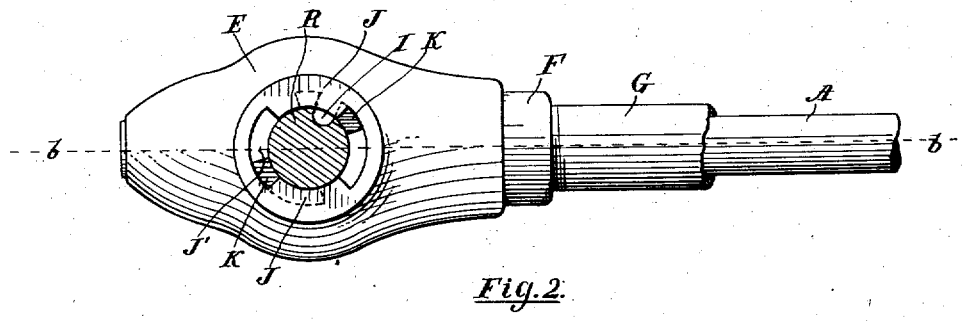
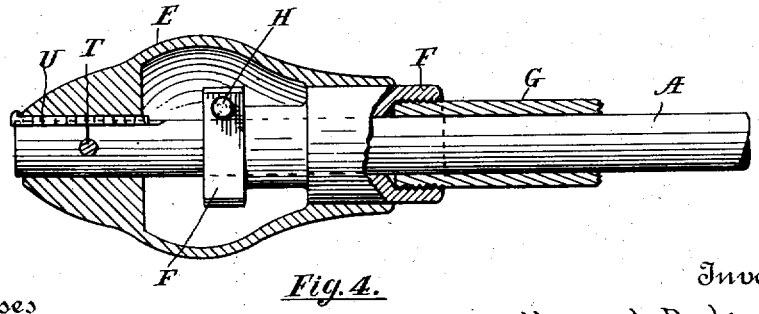
Witnesses
Georgiana Chace
Palmer A. Jones.
Inventor
Harry J. Perkins
By Luther V. Moulton
Attorney No. 12,665. REISSUED JUNE 25, 1907.

H. J. PERKINS.

PROPELLER WHEEL.

APPLICATION FILED APR. 25, 1907.

3 SHEETS—SHEET 2.

Witnesses

Georgiana Chace

Palmer A. Jones.

Inventor

Harry J. Perkins

By Luther V. Moulton

Attorney

No. 12,665. REISSUED JUNE 25, 1907.

H. J. PERKINS.

PROPELLER WHEEL.

APPLICATION FILED APR. 25, 1907.

3 SHEETS—SHEET 3.

Witnesses
Georgiana Chace
Palmer A. Jones

Inventor
Harry J. Perkins
By Luther V. Moulton
Attorney

UNITED STATES PATENT OFFICE.

HARRY J. PERKINS, OF GRAND RAPIDS, MICHIGAN, ASSIGNOR OF ONE-THIRD TO FREDERICK L. PERKINS AND ONE-THIRD TO CHARLES E. PERKINS, OF GRAND RAPIDS, MICHIGAN.

PROPELLER-WHEEL.

No. 12,665. Specification of Reissued Letters Patent. Reissued June 25, 1907.

Original No. 801,685, dated October 10, 1905. Application for reissue filed April 25, 1907. Serial No. 370,330.

*To all whom it may concern:*

Be it known that I, HARRY J. PERKINS, a citizen of the United States, residing at Grand Rapids, in the county of Kent and State of Michigan, have invented new and useful Improvements in Propeller-Wheels, of which the following is a specification.

This invention relates to certain new and useful improvements in propeller wheels, and especially to propeller-wheels having shiftable blades for the purpose of reversing the position of the blades in the water; and the invention consists in the construction and arrangement of parts hereinafter pointed out and claimed.

The objects of the invention are, first, to furnish novel means for detachably connecting propeller-blades to the hub of the propeller-wheel; second, to furnish means whereby the blades may be readily removed from the hub and replaced therein; third, to furnish a superior means for locking the blades individually in the hub and also to exclude the water from the interior of the hub; fourth, to furnish a blade-shifting device whereby the connection between the blades and the shifting device can be readily disconnected by a lever or other suitable means located within the boat; fifth, other objects hereinafter described and claimed. These objects I accomplish by means of the mechanism illustrated in the accompanying drawings, in which—

Figure 5:
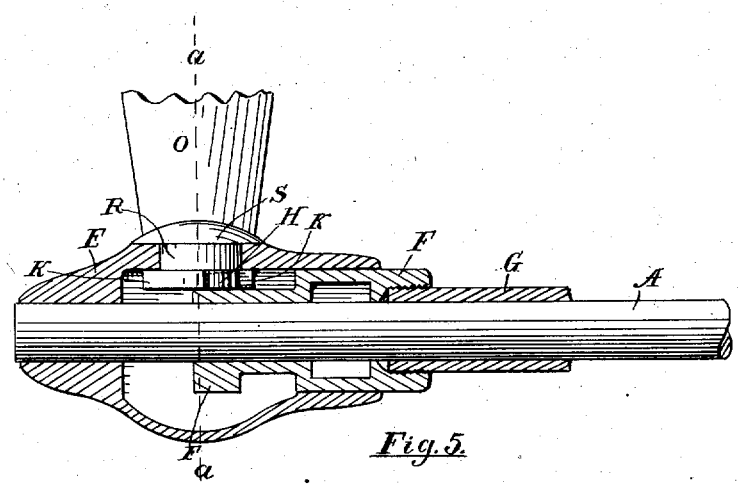
Figure 6:
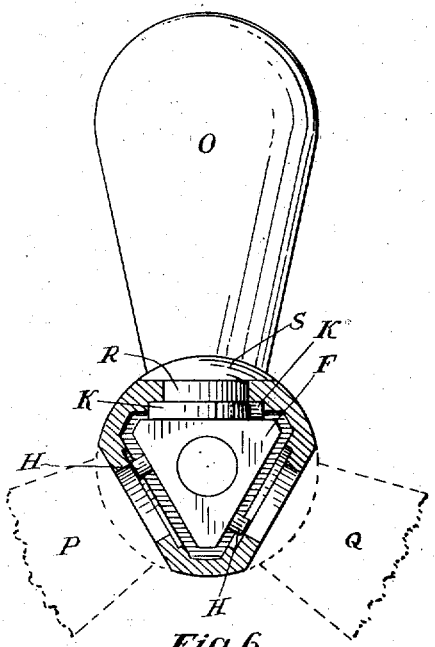
Figure 7:
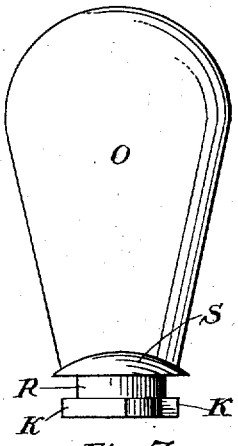
Figure 8:
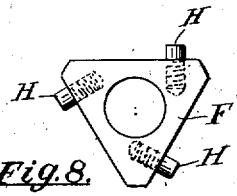
Figure 9:
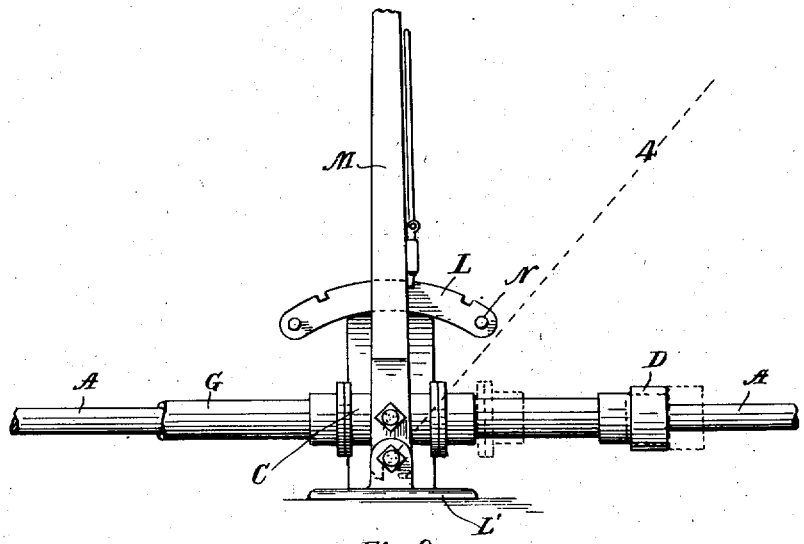
Figure 10:
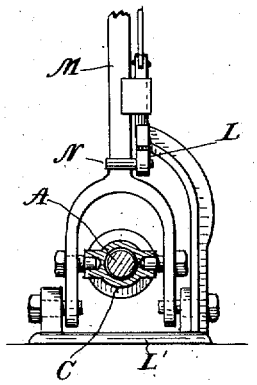

Figure 1. is a side elevation of a propeller shaft and wheel with the shifting lever attached, the dotted lines showing the positions which the lever may assume for the purpose of changing the pitch of the blades and for unlocking the blades from the hub. Fig. 2. is a plan view, on an enlarged scale, of the hub and a portion of the shaft and sleeve, showing my preferred form of opening in the hub which receives the shank of the blade; Fig. 3. is an end view of a blade, the dotted lines showing the shape of the shank which corresponds with the opening which receives the same into the hub; Fig. 4. is a longitudinal vertical section of the hub and sleeve with the propeller-shaft in place, showing one of the pins which engages with the blade, also showing the bearing of the hub upon the collar: Fig. 5. is a sectional view on line *b b* of Fig. 2. showing the position of the shank of the blade when the same is secured within the hub and also showing in dotted lines one of the connecting-pins on the movable collar which shifts the blade. Fig. 6. is a sectional view of the hub on line *a a* of Fig. 5. showing the form of the openings in the hub which receive the shanks of the blades, the form of the movable collar, and also showing the position of the blades; Fig. 7. shows an elevation of a blade detached, illustrating the construction of my preferred form of shank and segmental shoulder said shoulder resting upon the flat surface of the outside of the hub and the enlarged portion of the shank adapted to be locked within the hub; Fig. 8. is an end view of the collar F, showing the device when adapted to engage with three propeller-blades; Fig. 9. is a side elevation, on a somewhat enlarged scale, of a part of the shaft and sleeve which surrounds the shaft, together with the lever and attachment for moving the sleeve and shifting the propeller-blades; Fig. 10. is an end view of the lever and quadrant with sleeve which surrounds the shaft shown in section.

Similar letters refer to similar parts throughout the several views.

A shows the propeller-shaft, of suitable construction, inclosed in a sleeve which passes through the stern-bearing B, having a suitable stuffing-box.

C is what I term a "thrust-collar" secured to the sleeve G and operated by means of a suitable lever M.

D is the inside stuffing-box, constructed in any suitable manner.

E is the propeller-hub.

F is a movable collar which carries the shifting pins or other means for engaging with the shanks of the propeller-blades. This collar F extends into the hub and also preferably outside of the hub, as shown, and is engaged by screw-threads or other means to the shifting sleeve G. In effect the collar F is but a continuation of the sleeve G; but I prefer to make it detachable therefrom for convenience of construction. The collar F is intended to make a water-tight slidable joint between its periphery and the hub E. The shifting collar F is provided with suitable means for engaging the propeller-blades, which in the example of my invention shown in the drawings is represented by pins H, in which drawings, I have shown the shifting collar F substantially triangular in cross-section at the point where it engages with the blades for the purpose of attaching the same to three propeller-blades. It will be understood, however, that the number of blades attached is not material to the invention. The pins H engage loosely with the slots I in the propeller-blades, which slots I are placed within the shank of the blades, as shown in the drawings. Each opening in the hub is preferably made somewhat in the shape of a key-hole, having projections J J, as shown in Fig. 2. of the drawings, giving the peculiar-shaped opening illustrated by J′. The form of this opening, however, may be varied to suit the shape of the shank of the propeller blade. The inner portion of the shank of the propeller-blade which passes through the shell of the hub beyond the projections J J forms a lock within the hub, the form being such that the shank may be readily inserted in the opening J′ and by turning the same slightly be locked therein. The form of the shank is fully illustrated by dotted lines in Fig. 3. and also shown in Fig. 7., K representing the enlarged or key-shaped portions of the shank which passes into the hub, one of which is provided with the groove I.

R shows the cylindrical neck between the portions K and the segmental shoulder S, said segmental shoulder S being ground smooth, so as to fit close against the flat portion of the hub, as shown in Fig. 6.

L is the quadrant and quadrant-frame, which supports the shifting-lever M, and is preferably provided with a plate L′ for securing the same rigidly to the boat. The shifting-lever M is provided with an ordinary locking device which forms no part of my invention and in and of itself requires no further description.

N is a removable stop placed in the quadrant, which stops the lever when shifted in one direction, so as to prevent the same from moving the sleeve G and the collar F sufficiently to detach the collar from the propeller-blades. When it is desired to remove any one or more of the propeller-blades from the hub, the stop N is removed and the lever M is shifted to the position shown in Figs. 1 and 9 by the dotted line 4. When the lever is shifted into this position, the collar F is drawn forward to such an extent that the shifting pins or connections H are entirely detached from the shank of the propeller-blades and the propeller-blades can be turned into position, so that the enlarged portions K register with the openings J′, and the blades can then be readily removed from the hub. The propeller blades are shown by O, P and Q. The hub E is rigidly secured to the shaft by any suitable means. In Fig. 4 I have shown it secured by means of the bolt T and the key U, the bolt T preventing longitudinal movement and the key U preventing rotary movement upon the shaft.

In Fig. 1. the solid line 1 shows the lever M in position to set the propeller-blades so as to drive the boat ahead. The dotted line indicated by 2 shows the position of the lever when the blades are shifted square with the shaft or in a neutral position, in which position the propeller-wheel when revolved will neither move the boat forward nor backward.

When the lever M is in the position shown by the dotted line 3, the blades are shifted so as to move the boat backward or reverse its motion. When in the position shown by dotted line 4, the shifting device is disconnected from the lever and the blades can be turned into position to be removed from the hub.

I claim

1. The combination of a shaft, a hub fixed on the shaft, a blade rotative in the hub to a limited extent for reversal, and further rotative for detachment from the hub, means for rotating the blade slidable longitudinally on the shaft and detachably engaging the blade, a lever attached to said means to slidably adjust the same, and a removable stop to limit the movement of the lever and prevent detachment of the blades.

2. The combination of a shaft, a hub fixed on the shaft, a blade rotative in the hub and detachable therefrom, a lateral projection on the blade and having a radial recess, a sleeve slidable longitudinally of the shaft, a pin moved by the sleeve, and engaging the recess to adjust and hold the blade during a limited longitudinal movement of the sleeve, said pin also being detached from the recess by a further movement of the sleeve, a lever attached to the sleeve to adjust the same, and a removable stop to limit the movement of the lever and prevent detachment of the pin from the slot.

3. The combination of a shaft, a hub fixed on the shaft, blades rotative on a radial axis, means for detachably securing the blades to the hub, said means being engaged and disengaged by rotation of the blades about said axis, a projection on each blade and having a radial recess, a collar slidable on the shaft, pins in the collar and engaging the recesses, a sleeve slidable on the shaft and attached to the collar, a lever to adjust the sleeve, and a removable stop to limit the movement of the lever, and prevent detachment of the pins from the recesses.

4. In combination with a propeller-shaft, a hollow hub fixed to said shaft and having a plurality of irregular openings, a plurality of blades having shouldered shanks at the inner ends thereof, said shanks inserted in said openings in the hub, and the shoulders adapted to engage the latter by turning the said blades, movable means within said hub for engaging the shoulders for moving the blades, and means for co-operating with said first-mentioned means for actuating the same.

5. In combination with a propeller-shaft, a hub rigidly secured to the said shaft, said hub provided with a plurality of irregular-shaped openings, said hub having enlarged spaces with the openings, a plurality of propeller blades, each propeller-blade provided with a shank and an enlarged portion at the inner end of the shank which passes through the shell of the said hub and is locked therein by shifting the blade, a sliding collar within the hub, means for connecting the said collar to the shanks of the propeller-blades, and means for giving a sliding motion to the said collar for the purpose of shifting the said propeller-blades to the required position.

6. In combination with a propeller-shaft, a hollow hub secured to the said shaft and having a plurality of flat faces, said faces having a key-shaped opening, an enlarged opening below the said key-shaped opening, a plurality of propeller-blades, each blade provided with a shouldered portion, a shank having an enlarged portion extending into the said propeller-hub and locked therein by turning the blade, a sliding collar within the hub, means for connecting the collar to the shanks of the blades, and means for giving the longitudinal movement to the said collar upon the propeller-shaft for the purpose of shifting the blades.

7. In combination with a propeller-shaft, a hub secured thereto and having a plurality of irregular openings, a plurality of blades, each provided with a shank adapted to fit into its corresponding opening in the hub and to be locked therein by turning the same, a sliding collar within the hub, means for connecting the collar to the shanks of the blades, a shifting device whereby the said collar is shifted to give the required pitch to the blades, and a removable stop to prevent the blades from being shifted in a position for removal from the said hub.

8. In combination with a propeller-shaft, a hub mounted upon the shaft and rigidly secured thereto, a sliding collar within the said hub, a sleeve connected to said sliding collar and operated by a lever, said hub having openings of irregular shape, propeller-blades having shanks adapted to fit the irregular-shaped openings and to be locked therein, means for detachably connecting the sliding collar to the said propeller-blades, and a removable stop for limiting the throw of the lever when shifting the propeller-blades.

9. In combination with a shaft of a propeller-wheel, a hub rigidly mounted thereon, a sliding collar partially within the said hub having a water-tight joint between the said hub and the said collar, said hub having a plurality of openings, each opening adapted to receive a shank of a propeller blade, a plurality of propeller-blades, each blade having a shank adapted to fit into the said opening and to be locked therein by turning, means for detachably connecting the said shanks to the said sliding collar, and means for shifting the said collar for the purpose of giving the required pitch to the propeller-blades, and also for shifting the collar so as to disconnect the same from the propeller-blades.

10. In combination with the shaft of a propeller-wheel a hub rigidly secured thereto, a plurality of openings, a plurality of propeller-blades having shanks adapted to fit the said openings so as to be locked therein when the said blades are shifted, a sliding collar within the said hub and having means for detachably connecting the said propeller-blades to the said sliding collar, a sleeve surrounding the said propeller-shaft and securely attached to the sliding collar, a lever and quadrant for operating the said shaft, and a removable stop, as N, for limiting the inward throw of the said lever.

11. In a propeller-wheel the combination: a propeller-shaft, a hub rigidly secured to the shaft, a plurality of blades detachably secured to the hub, a sleeve detachably connected to the blades, a lever for operating the said blades whereby the said blades may be tilted to a position for giving it a backward motion, to a neutral point and to a position for unlocking the said sleeve from the blades, and a removable stop for arresting the movement of the lever when it is not desirable to unlock or detach the sleeve from the blades.

In testimony whereof I have hereunto set my hand in presence of two subscribing witnesses.

HARRY J. PERKINS.

Witnesses:
LUTHER V. MOULTON,
GEORGIANA CHACE.